United States Patent [19]

Knudsen

[11] 4,334,264
[45] Jun. 8, 1982

[54] HIGH VOLTAGE DIRECT CURRENT TRANSMISSION APPARATUS

[75] Inventor: Lars Knudsen, Ludvika, Sweden

[73] Assignee: ASEA Aktiebolag, Vasteras, Sweden

[21] Appl. No.: 220,489

[22] Filed: Dec. 29, 1980

[30] Foreign Application Priority Data

Dec. 28, 1979 [SE] Sweden .................................. 7910716

[51] Int. Cl.³ .............................................. H02H 7/00
[52] U.S. Cl. ....................................... 363/51; 361/130
[58] Field of Search ...................... 363/35, 37, 51, 53, 363/54, 57, 58; 361/56, 118–119, 129, 130

[56] References Cited

U.S. PATENT DOCUMENTS 2,730,667  1/1956  Uhlmann ........................... 363/51 X
2,763,818  9/1956  Beck et al. ........................... 361/129
3,628,124  12/1971  Johansson .............................. 363/51

Primary Examiner—William M. Shoop
Assistant Examiner—Peter S. Wong
Attorney, Agent, or Firm—Pollock, Vande Sande & Priddy

[57] ABSTRACT

A high voltage direct current transmission apparatus having a DC carrying line (L1, K, L2) and including voltage-limiting members (A1, A2) which are arranged so that the limiting level is higher for a line voltage ($u_D$) of one polarity than for a line voltage of an opposite polarity, and so that for both polarities the limiting level is other than zero.

8 Claims, 5 Drawing Figures

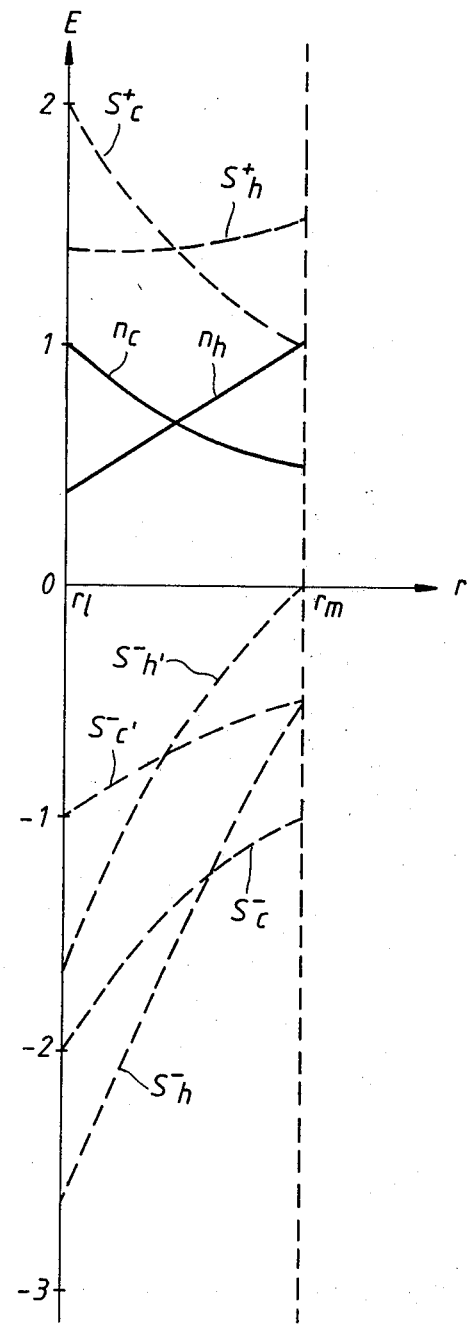
FIG. 2
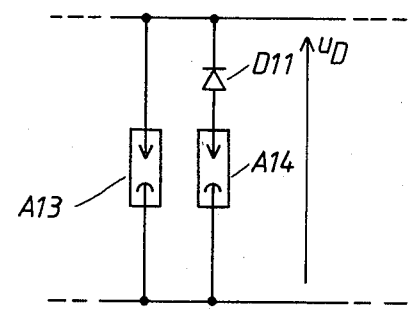
FIG. 3
FIG. 4
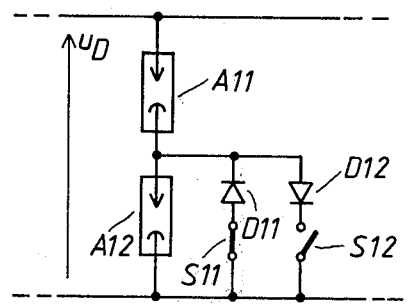
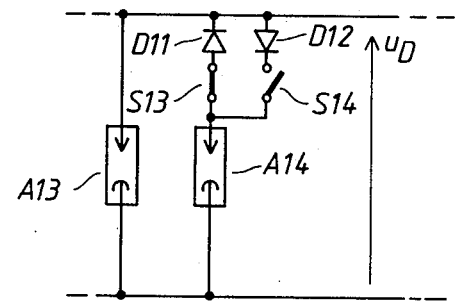
FIG. 5

HIGH VOLTAGE DIRECT CURRENT TRANSMISSION APPARATUS

FIELD OF THE INVENTION

The present invention relates to a high voltage direct current (HVDC) transmission apparatus having a DC carrying line, and including voltage-limiting members for limiting the line voltage to a predetermined limiting level.

BACKGROUND OF THE INVENTION

A transmission of this kind frequently comprises a DC cable. In the past, the voltage-limiting members have been formed so as to have the same limiting level for both polarities of the line voltage. In this connection it has been found that in certain cases transient overvoltages may cause high field strengths in the cable, which has necessitated a limitation of the operating voltage of the transmission.

BRIEF SUMMARY OF THE INVENTION

The primary object of the present invention is to make possible, in an HVDC transmission of the above kind, operation at higher voltages than in the past without the maximum field strength stresses increasing.

A further object of the invention is to allow for an instantaneous polarity reversal of the voltage of the transmission, for example to provide a rapid and efficient extinction of an arc in the event of a fault on the line, or for reversing the power direction in case of certain events in the connected AC systems.

The invention will be described in greater detail with reference to the accompanying FIGS. 1-5, in which:

BRIEF DESCRIPTION OF THE DRAWINGS

FIG. 2 is a graphical representation of field strengths appearing in a cable for different operating cases.

FIGS. 3-5 are circuit diagrams of embodiments of the voltage-limiting members according to the invention.

DETAILED DESCRIPTION OF EMBODIMENTS

Figure 1:
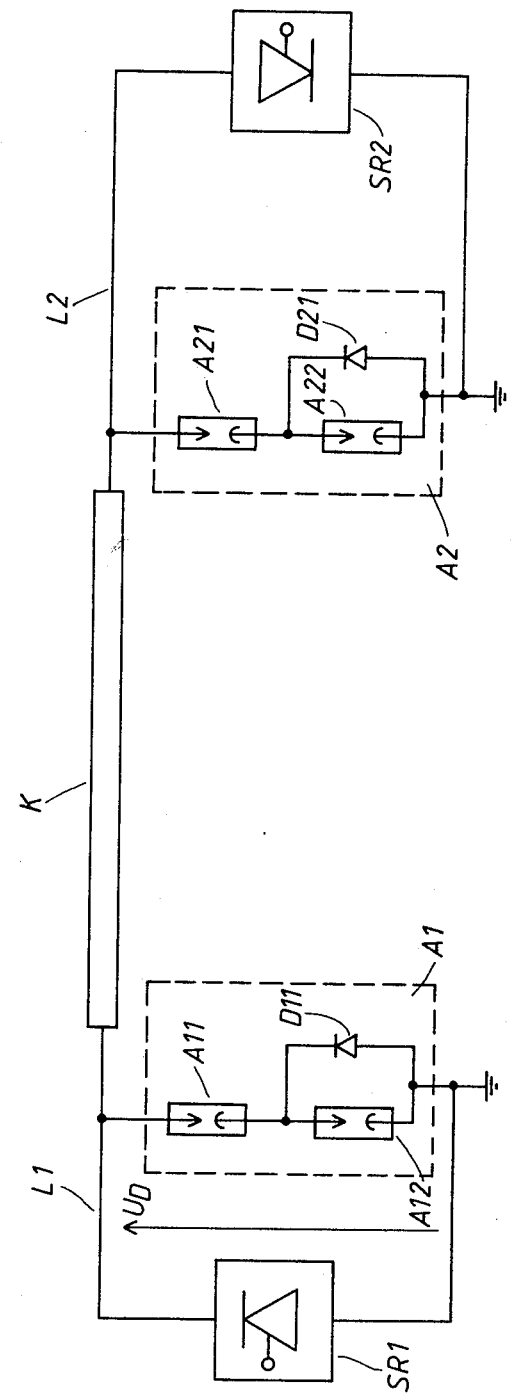
FIG. 1 illustrates a transmission apparatus according to the invention.

FIG. 1 shows an HVDC transmission apparatus having two converter stations SR1 and SR2, which are connected to each other via a DC line consisting of overhead lines L1 and L2 and a DC cable K. At both ends of the cable voltage-limiting members A1 and A2 are arranged to limit the amplitude of the overvoltages, for example which may be caused by lightning which enters the cable from an overhead line, so that they do not exceed a predetermined level (the level of protection of the limiting member). The limiting member A1 comprises two series-connected surge diverter means A11 and A12 connected between the line and ground. Surge diverter A12 is parallel-connected to a diode valve D11, which may comprise a number of series-connected semiconductor diodes.

Similarly, limiting member A2 consists of two surge diverters A21 and A22, and a diode valve D21.

The transmission apparatus in the example according to FIG. 1 is intended to operate, in normal operation, with a positive polarity of the line relative to ground, that is, $u_D$ in FIG. 1 is positive. Overvoltages of the same polarity (positive) as the normal operation polarity are blocked by diodes D11 and D21, and the levels of protection of the limiting members are the sum of the two levels of protection of the two surge diverters. For overvoltages of a polarity (negative) which is opposite to the polarity during normal operation, diodes D11 and D21 are conducting, and the level of protection at this polarity is the same as the levels of protection of the surge diverters A11 and A21.

Overvoltages of the same polarity as the operating voltage has during normal operation will thus be limited to a higher value, and overvoltages of opposite polarity will be limited to a lower value. The levels of protection for the two polarities may be chosen at desired values by a suitable choice of operating levels of the surge diverters.

FIG. 2 shows the field strength E in a typical DC cable (with solid insulating material) as a function of the distance r from the centre of the cable. The radius of the conductor is designated $r_1$ and the inside radius of the sheath is designated $r_m$. The field strength $E=1$ is the field strength which is obtained nearest the conductor in a cold cable and during operation with the rated voltage of the transmission.

The electric field in the insulation between the conductor and the sheath is distributed in two ways depending on the type of voltage that causes the stress. These are:

(1) Field strength caused by the operating voltage.
(2) Field strength from transient superimposed voltages.

The latter is distributed purely capacitively in the insulating medium because of its shorter duration, which means that the field decreases in inverse proportion to the distance from the mid-point of the conductor.

However, with regard to the field strength originating from the operating voltage, the situation is different. A direct voltage is distributed in stationary condition purely resistively in an insulating medium. The resistive voltage distribution corresponds in the cylindrical geometry between conductor and sheath to the capacitive voltage distribution if the resistivity is the same at all points of the insulating medium. This is the case immediately after a voltage has been applied to a cold cable. The field strength distribution in case of a cold cable, to which the rated voltage is applied, is depicted by curve $n_c$ in FIG. 2.

However, the resistivity is not constant but is instead dependent primarily on the temperature and secondarily on the electric field. During operation with a heated conductor (i.e. $I_d>0$), a negative temperature gradient is therefore formed between conductor and sheath, which results in the resistivity acquiring a positive differential coefficient with respect to the distance from the midpoint of the conductor. This means that the stationary voltage distribution obtained by the operating voltage will be dependent on the magnitude of the load current. At low load, the distribution is almost identical to the purely resistive distribution, but when the cable is utilized in full with respect to current, the distribution has become inverted with maximum field strength at the sheath. A typical cable reaches its stationary temperature distribution after a few hours or after a day or two, and the field strength distribution at rated load and rated voltage in stationary condition is shown by curve $n_h$ in FIG. 2. A cable is usually dimensioned so that the same (or almost the same) maximum field strength is obtained at the rated voltage both with a cold (curve $n_c$) and a hot (curve $n_h$) cable. When a voltage transient appears superimposed on the operating voltage, the stress from the transient (the transient voltage being the difference between total voltage and operating voltage) is distributed capacitively between conductor and sheath quite independently of the distribution of the operating field. The total field strength is obtained by superposition of these two components which are independent of each other.

In the following description it is first assumed that the level of protection in both directions of the limiting members (A1 and A2 in FIG. 1) is the same for both polarities, and that the cable operates at the rated voltage. The level of protection is assumed to be twice the rated voltage.

A positive transient—which thus has the same polarity as the operating voltage—maximally gives rise to a field strength component of the same magnitude and characteristic as the operating field for a cold cable (curve $n_c$ in FIG. 2). This component is added to the operating field. The resultant field strength in a cold cable is the curve $S^+{}_c$ for a cold cable and the curve $S^+{}_h$ for a hot cable.

A negative transient, on the other hand, may at the most have an amplitude which is three times as great as the rated voltage and may give rise to a negative field strength component of the same appearance as curve $n_c$ but with treble the amplitude. The resultant field strength distribution is obtained by adding this (negative) component to the operating voltage. The results are the curve $S^-{}_c$ in a cold cable and the curve $S^-{}_h$ in a hot cable. As will be seen, the maximum field strength in a hot cable is considerably higher than the maximum field strength with a positive transient and a cold cable. The field strength with negative transient and a hot cable will therefore be dimensioning. The above information, of course, refers to prior art transmissions.

In an HVDC transmission apparatus according to the invention, the level of protection is, however, lower for overvoltages of a polarity opposite to the normal operating voltage. We will assume that the level of protection in the transmission according to the invention for positive polarity is the same as that mentioned above, that is equal to twice the operating voltage, but that it is only half as great, that is equal to the operating voltage, for negative polarity.

For transient overvoltages of positive polarity the conditions are therefore the same as those described above—curves $S^+{}_c$ and $S^+{}_h$ apply to a cold and a hot cable, respectively. On the other hand, an overvoltage with negative polarity may at most give rise to a field strength component with twice the amplitude of curve $n_c$ in FIG. 2. This negative component, added to the operating field, gives the resultant field strength distribution, which is the curve $S^-{}_c$, for a cold cable and the curve $S^-{}_h$, for a hot cable. In both cases the maximum field strength is lower than the maximum field strength obtained with a cold cable and positive transient. Thus, when dimensioning the cable, only transient voltages of the same polarity as the operating voltage need be considered, which means that the cable may be dimensioned for a lower maximum field strength than what has been possible in the past. Alternatively, a certain cable may be operated with a higher voltage than what has been possible in the past.

FIG. 3 shows an alternative embodiment of one of the voltage-limiting members according to FIG. 1. A first surge diverter means A13 is connected between the line and ground and has a level of protection adapted to transients with the same polarity as the operating voltage. A second surge diverter A14 has a lower level of protection and is connected to the line in series with a diode connection D11. It therefore starts to operate only for transients with a polarity opposite to the operating voltage (which is assumed to be positive).

It is frequently a requirement to change the polarity of the operating voltage of the transmission. Sometimes it is a requirement to do this only for a short interval, for example in the event of emergency power reversal or for extinguishing a short-circuit arc. This is entirely possible in the transmission described in FIG. 1 (and FIG. 3), although with a voltage limited to the lower level of protection for negative polarity.

For a more permanent polarity change, the voltage-limiting members are suitably made switchable. The surge diverter connection A1 according to FIG. 1 may be made switchable by arranging, according to FIG. 4, a switch S11 in series with diode D11, and connecting a second diode D12 with opposite conducting direction in series with a second switch 12 in parallel across the surge diverter A12. During operation with positive operating voltage $u_D$, switch S11 is closed and switch S12 is open. After a change in polarity of the operating voltage, the transmission is suitably operated with a lower operating voltage adapted to the lower level of protection prevailing for this polarity. When the cable insulation has been recharged to a sufficient extent, for example after 0.5 to 4 hours, switch S11 is opened and switch S12 is closed, whereafter the operating voltage is increased to full value. The transmission now operates, as prior to the polarity change, with a higher level of protection for the polarity of the operating voltage and with a lower level of protection for the opposite polarity.

For the surge diverter connection according to FIG. 3, the same function may be obtained by arranging an additional diode D12 and two switches S13 and S14 according to FIG. 5.

As will be clear from FIG. 2, in an HVDC transmission according to the invention the maximum field strength is obtained at a transient of the same polarity as the operating voltage and with a cold cable. By starting the transmission (cold cable) at reduced voltage and reduced level of protection for said transients (e.g. with part of the surge diverter short-circuited), the field strength stress now mentioned may be reduced so as not to exceed the field strength stresses obtained in other cases. When, after a start, the cable has been sufficiently heated, the operating voltage and the level of protection may be increased to their full values.

Because the level of protection for voltages of a polarity opposite to the operating voltage is not zero but has a finite value which is not too low, considerable advantages are gained. For one thing, in case of a fault the voltage may be instantaneously reversed without switching of the surge diverter protection. In this way short-circuit currents may be reduced more rapidly and a more reliable extinction of any arcs is obtained. Further, the power direction of the tranmission may be instantaneously reversed, which involves considerable advantages in some situations.

To attain the above-mentioned advantages with the invention, it has been found that it is suitable for the lower of the two limiting levels to be within a preferred interval in relation to the higher level. The lower limiting level should be at least 0.2 times the higher limiting level and at the most 0.8 times the higher limiting level, as within this interval the above-mentioned advantages of the invention are obtained to the greatest possible extent.

The transmission shown in FIG. 1 is intended substantially for unidirectional power transmission. By making the voltage-limiting members switchable (e.g. according to FIG. 4 and FIG. 5), the transmission may be made bidirectional that is, it may transmit full power in both directions. A change in power direction then takes place by changing the polarity of the operating voltage $u_D$. Another way of achieving two-way power transmission is to make possible (with maintained polarity of the operating voltage) a change of the current direction. This can be achieved by providing the converters SR1 and SR2 with pole reversal switches, or by designing each of the converters as a double converter.

In the transmission shown in FIG. 1, the operating voltage is normally positive relative to ground, but alternatively, the transmission may, of course, be arranged to operate with a normally negative operating voltage.

In the embodiment according to FIG. 4, the diode connections D11, D12 with the switches S11, S12 may be replaced with one single diode connection provided with a pole reversal switch and the same is true of FIG. 5.

It should be understood that the embodiments of the voltage-limiting members (A1 and A2 in FIG. 1) described above are only examples, and many other embodiments are feasible within the scope of the invention. Further, it should be understood that while I have described certain embodiments of the invention, I do not intend to be restricted thereto, but rather intend to cover all variations and modifications which come within the spirit of the invention, which is limited only by the claims which are appended hereto.

I claim:

1. High voltage direct current (HVDC) transmission apparatus having a DC carrying line (L1, K, L2), the apparatus including voltage-limiting members (A1, A2) for limiting the line voltage ($u_D$) to a predetermined limiting level, characterised in that the limiting members (A1, A2) include means for causing the limiting level to be higher for voltage of one polarity than for voltage of the opposite polarity and to be different from zero for both polarities.

2. HVDC transmission apparatus according to claim 1, in which during normal operation the direct voltage ($u_D$) has a certain polarity, and wherein said higher limiting level is for said certain polarity.

3. HVDC transmission apparatus according to claim 2, which is arranged in normal operation to operate with either of the two possible polarities of the direct voltage, characterised in that the voltage-limiting members (A1, A2) include switching means (e.g. S11, S12) for causing said higher limiting level to prevail for the polarity at which the transmission apparatus is operating at.

4. HVDC transmission apparatus according to claim 1, in which the line comprises a DC cable (K), characterised in that a said voltage-limiting member is located at each of the two ends of the cable.

5. HVDC transmission apparatus according to claim 1, characterised in that each voltage-limiting member includes two limiting means (e.g. A11, A12) which are series-connected to each other, one of said limiting means being connected in parallel with a means (D11) which is blocking for voltage of one polarity and conducting for voltage of the opposite polarity.

6. HVDC transmission apparatus according to claim 1, characterised in that each voltage-limiting member comprises two limiting means (e.g. A13, A14) which are parallel-connected to each other, one means having a higher limiting level than the other, the limiting means with the lower limiting level (A14) being connected in series with a means (D11) which is blocking for voltage of one polarity and conducting for voltage of the opposite polarity.

7. HVDC transmission apparatus according to claim 1, characterised in that the lower limiting level is at least 0.2 times the higher limiting level and at most 0.8 times the higher limiting level.

8. HVDC transmission apparatus according to claim 1, characterised in that the lower limiting level is of sufficient magnitude to permit protective measures, such as short-circuit arc extinction or emergency power reversal, to be carried out by reversal of the transmission voltage.

* * * * *